United States Patent
Collins et al.

(10) Patent No.: US 11,780,239 B2
(45) Date of Patent: Oct. 10, 2023

(54) CONTROL METHODS AND SYSTEMS

(71) Applicant: Global Inkjet Systems Limited, Cambridge (GB)

(72) Inventors: Philip Collins, Cambridge (GB); Nicholas Campbell Geddes, Suffolk (GB); Damian Howard Laurence Smith, Cambridgeshire (GB)

(73) Assignee: Global Inkjet Systems Limited, Cambridge (GB)

( * ) Notice: Subject to any disclaimer, the term of this patent is extended or adjusted under 35 U.S.C. 154(b) by 159 days.

(21) Appl. No.: 17/319,648

(22) Filed: May 13, 2021

(65) Prior Publication Data

US 2021/0347168 A1     Nov. 11, 2021

Related U.S. Application Data

(63) Continuation of application No. PCT/GB2019/052594, filed on Sep. 16, 2019.

(30) Foreign Application Priority Data

Nov. 16, 2018 (GB) ...................... 1818679

(51) Int. Cl.
  *B41J 2/045* (2006.01)
  *B41J 3/407* (2006.01)
  (Continued)

(52) U.S. Cl.
  CPC ......... *B41J 3/4073* (2013.01); *B41J 2/04508* (2013.01); *B41J 2/04526* (2013.01);
  (Continued)

(58) Field of Classification Search
  CPC ....................................................... B41J 3/4073
  See application file for complete search history.

(56) References Cited

U.S. PATENT DOCUMENTS

2001/0017085 A1   8/2001  Kubo et al.
2004/0252174 A1  12/2004  Baxter
(Continued)

FOREIGN PATENT DOCUMENTS

GB      2 376 920 A    12/2002
JP      2015516898 A    6/2015
(Continued)

OTHER PUBLICATIONS

Chinese Office Action for Application No. 201980067642 dated Jul. 15, 2022.
(Continued)

*Primary Examiner* — Shelby L Fidler
(74) *Attorney, Agent, or Firm* — KDW Firm PLLC

(57) ABSTRACT

A method of controlling a system including an arrangement of at least two nozzles, wherein the arrangement and the shape move relative to each other, each nozzle traces a respective path on the shape, and each nozzle is configured to jet drops at actual jetting locations along the respective path of the nozzle. The method results in sequence of actuation events received from a control signal to be more frequent than would be needed for an arrangement printing on a flat surface to produce the required dot resolution. It is then possible to select which of the individual nozzles are to jet for a given actuation event from the sequence so that the actual jetting locations deviate from the target jetting locations by no ore than a define maximum error distance.

17 Claims, 2 Drawing Sheets

(51) Int. Cl.
    *B41J 2/205*     (2006.01)
    *B41M 5/00*     (2006.01)

(52) U.S. Cl.
    CPC ......... *B41J 2/04581* (2013.01); *B41J 2/2054* (2013.01); *B41M 5/0088* (2013.01)

(56) References Cited

U.S. PATENT DOCUMENTS

| | | | |
|---|---|---|---|
| 2006/0158470 A1* | 7/2006 | Vanheusden | B41J 25/308 347/8 |
| 2012/0274683 A1* | 11/2012 | Yamasaki | B41J 29/02 347/2 |
| 2015/0085006 A1 | 3/2015 | Nick et al. | |
| 2019/0270306 A1* | 9/2019 | Uroz Soria | B41J 2/2135 |

FOREIGN PATENT DOCUMENTS

| | | |
|---|---|---|
| JP | 2018001571 A | 1/2018 |
| WO | WO 2020/099820 A1 | 5/2020 |

OTHER PUBLICATIONS

Indian Examination Report for Application No. 202127021927 dated Aug. 1, 2022.

International Search Report, International Preliminary Report on Patentability and Written Opinion for Application No. PCT/GB2019/052594 dated Nov. 11, 2019.

Japanese Office Action for Application No. 2021526688 dated Jun. 28, 2023.

\* cited by examiner

CONTROL METHODS AND SYSTEMS

CROSS-REFERENCE TO RELATED APPLICATIONS

This application is a continuation of and claims priority to PCT/GB2019/052594 filed Sep. 16, 2019, which claims the benefit of and priority to GB Patent Application No. 1818679.1 filed Nov. 16, 2018, the entire disclosures of which are incorporated by reference herein.

TECHNICAL FIELD

Aspects of the disclosure herein generally relate to control methods and systems for dispensing at target locations. In particular, aspects of the disclosure herein relate to inkjet printing systems for dispensing ink on surfaces to be printed, and controlling such systems to maintain density, particularly when printing curved regions on the surface of an object.

BACKGROUND

Modern inkjet printing systems typically include printheads containing multiple droplet ejection devices, also referred to as "nozzles" which form nozzle arrays. Each nozzle typically comprises an actuator that is arranged to eject ink from the nozzle when actuated. Such actuators include piezoelectric actuators for example.

Actuators are driven by drive electronics (electronic drive circuits) which provide a voltage waveform or common drive signal, (also known as an "ejection pulse", "printing pulse" or "fire pulse"), which is configured to result in the ejection of ink from a nozzle. For example, an actuation event creates a pressure pulse in an ink chamber of the nozzle, which in turn dispenses a drop of ink.

In many applications the drive electronics supply a common drive signal to many nozzles, and a separate or integrated controller provides data switching to the printhead that determines which of the individual nozzles are to jet ink for a given instance of the actuation event. Data for a group of nozzles associated with a shared actuation event is called "stripe data".

By arranging a coordinated sequence of drive signals and switching inputs, the printhead produces an image on a substrate in the form of a pixel array as the printhead and substrate move relative to one another. This is applicable to, but not restricted to, single-pass printing systems, and scanning printing systems. Data for such a coordinated sequence of actuation events being one or more instances of "stripe data" is called "swathe data".

The printing resolution refers to the number of dots printed in a unit distance and the pitch is its reciprocal. For example, printed dots placed at a pitch of 254 µm could be described as having a resolution of 100 dots per inch. Process-direction resolution is the printed dot spacing along the relative path between the nozzle array and substrate. Cross-process resolution is the printed dot spacing perpendicular to this. Unless otherwise specified, "resolution" indicates process-direction resolution.

It is common for the electronic drive circuit to be synchronized with the substrate position to be printed by way of an "encoder", clock or similar synchronization device that monitors the relative motion of the substrate and the printhead either directly or indirectly. The purpose of this synchronization is to ensure that the actuation process and substrate motion will result in the printing of dots at the required resolution. In other words, encoders may be used to coordinate the actuation process with the substrate positions that are intended to be printed, which we refer to as a "target jetting locations". Such synchronization usually works well for inkjet printing on flat surfaces, where all nozzles move relative to the substrate at the same speed.

It is also possible to synchronize the actuation process and relative substrate motion by knowing the relative speed of the substrate and measuring elapsed time. This includes systems in which the speed varies in a known or measurable way.

However, when using a printhead to print along curved paths or onto curved surfaces, the relative velocity of individual nozzles with the surface being printed can vary, so that if a series of actuation events is sent to the nozzle array, the resulting dot pattern varies in resolution. If uncorrected, the density of the ink droplets that are applied to the surface varies across the printed region. This variation causes undesirable defects in the printed image.

A known approach to correct density is to perform a 2D linearization of the source image in order to compensate for density errors on the surface of the shape. Whilst such an approach works in theory, in practice, however, the different drop densities give rise to changes in dot gain, ink mixing, and other effects that present complex correction problems.

It is to these problems, amongst others, that aspects according to the disclosure herein attempt to offer a solution.

SUMMARY

According to a first independent aspect of the disclosure herein, there is provided a method of controlling a system comprising an arrangement of at least two nozzles, wherein the arrangement and a surface of an object move relative to each other, each nozzle traces a respective path on the surface of the object, and each nozzle is configured to jet drops at actual jetting locations along the respective path of the nozzle, the method comprising the steps of:

defining, for each path traced by a nozzle, a plurality of target jetting locations regularly spaced by a target pitch;

determining the maximum velocity any nozzle from the arrangement reaches along the respective path of the nozzle during the relative movement;

defining an error distance associated with each target jetting location to be the distance between the target jetting location and an actual jetting location which is closest to the target jetting location;

setting a maximum value for the error distance, wherein the maximum value is greater than zero;

providing a first control signal comprising a sequence of actuation events for the arrangement, wherein the first control signal is common to all nozzles in the arrangement, wherein the sequence of actuation events corresponds to a sequence of potential jetting locations for each nozzle along the path traced by the nozzle, wherein the actuation events are provided at a regular interval, the interval being chosen so that the maximum distance between consecutive potential jetting locations for all nozzles is limited to twice the maximum value for the error distance in the actual jetting location, wherein the maximum distance is the interval multiplied by the maximum velocity;

for each nozzle, choosing a subset of the potential jetting locations which is the set of actual jetting locations for the nozzle wherein for each target jetting location of that nozzle there is an actual jetting location in the set that is closer to the target jetting location than the maximum value for the error distance; and determining, for each actuation event in the sequence of actuation events, the subset of nozzles from the arrangement wherein each nozzle is at an actual jetting location from the set of actual jetting locations for the nozzle.

It will be appreciated that by 'interval' we mean a time interval or an interval between encoder pulses for example. Accordingly, the units for 'interval' and 'velocity' may vary depending on the synchronization method used. It will be understood that the defined error distance and target pitch are in the process direction.

In a dependent aspect, the maximum value of the error distance is less than half the target pitch, preferably around 10-20% of the target pitch.

In a dependent aspect, the method further comprises the steps of: providing image data for each actual jetting location, and providing a second control signal to the arrangement to jet drops according to the image data. It will be appreciated that providing image data may be achieved by methods known in the art. The image data specifies whether or not to jet a dot at each actual jetting location (e.g. for a binary image), and in some cases how large a dot to jet (e.g. for a greyscale image).

In a dependent aspect, the method steps are carried out for a first relative movement with a first maximum velocity and a first interval, the method steps then repeated for a second relative movement with a second maximum velocity different to the first maximum velocity and with a second interval different to the first interval. In some cases, it would be advantageous to divide a movement into smaller, contiguous movements (e.g. contiguous path segments) with different maximum velocities and to select corresponding different values for the interval for each movement.

In a dependent aspect, the step of choosing a subset of the potential jetting locations comprises identifying an actual jetting location in the set that is closest to the target jetting location. This is advantageous in areas of low nozzle velocity where several potential jetting locations are less than the maximum error distance from the target jetting location.

Alternatively, it will be appreciated by the skilled person that we may choose a different potential jetting location other than the closest one, in order to meet some other image processing objective. For example, to prevent quantization artefacts in flatter areas, it may be advantageous to inject noise by varying the selection of actual jetting locations within the maximum error distance.

In a dependent aspect, in the step of defining, for each path traced by a nozzle, a plurality of target jetting locations regularly spaced by a target pitch: a position of the first target jetting location is set within a distance from the start of the path equal to the target pitch, wherein the distance is varied between paths according to a random distribution. The start of path is defined by the position pointed at by the nozzle at the start of the movement. Advantageously, this injection of noise in the target jetting positions prevents the formation of effects such as Moiré interference in the actual jetting positions.

In a dependent aspect, the method comprises the step of providing a synchronization element (such as an encoder, or clock for example) for coordinating the control signal with the movement of the arrangement relative to the surface of the object.

The disclosure herein therefore provides a method by which the sequence of actuation events (fire pulses) received from the control signal are more frequent than would be needed for an arrangement printing on a flat surface to produce the required dot resolution. It is then possible to select which of the individual nozzles are to jet for a given actuation event from the sequence so that the actual jetting locations deviate from the target jetting locations by no more than a defined maximum error distance.

The potential jetting locations of the nozzles may be thought of as an array of dot positions. Advantageously, the disclosure herein provides a method by which an array of addressable dot positions may be established onto a surface of an object, including a curved surface for example, so that those dot positions may be jetted by nozzles of a print system moving at different speeds.

The method is advantageous for printing on curved surfaces on various shapes or, for example, on curved paths on flat surfaces in situations when a printhead is controlled by a robot arm rather than a linear actuator.

According to a second independent aspect of the disclosure herein, there is provided a control system for an arrangement of at least two nozzles, wherein the arrangement and a surface of an object are moveable relative to each other, each nozzle being configured to trace a respective path on the surface of the object, and configured to jet drops at actual jetting locations along the respective path of the nozzle, the system comprising a processor configured to:

define, for each path to be traced by a nozzle, a plurality of target jetting locations regularly spaced by a target pitch;

determine the maximum velocity any nozzle from the arrangement reaches along the respective path of the nozzle during the relative movement;

define an error distance associated with each target jetting location to be the distance between the target jetting location and an actual jetting location which is closest to the target jetting location;

set a maximum value for the error distance, wherein the maximum value is greater than zero;

provide a first control signal comprising a sequence of actuation events for the arrangement, wherein the first control signal is common to all nozzles in the arrangement, wherein the sequence of actuation events corresponds to a sequence of potential jetting locations for each nozzle along the path traced by the nozzle, wherein the actuation events are provided at a regular interval, the interval being chosen so that the maximum distance between consecutive potential jetting locations for all nozzles is limited to twice the maximum value for the error distance in the actual jetting location, wherein the maximum distance is the interval multiplied by the maximum velocity;

for each nozzle, choose a subset of the potential jetting locations which is the set of actual jetting locations for the nozzle wherein for each target jetting location of that nozzle there is an actual jetting location in the set that is closer to the target jetting location than the maximum value for the error distance; and determine, for each actuation event in the sequence of actuation events, the subset of nozzles from the arrangement wherein each nozzle is at an actual jetting location from the set of actual jetting locations for the nozzle.

In a dependent aspect, there is provided a printing system comprising a control system according to the second independent aspect.

It will be understood that the inventive concept may be used in a variety of applications, to control any systems which carry out an action at actual actuating locations along a curved path or on the curved surface of a shape, for example heating an element, moving a needle, or triggering a sensor. Accordingly, in a comparative example, there is provided a control system for an arrangement of at least two actuators, wherein the arrangement and a shape are moveable relative to each other, each actuator being configured to trace a respective path on the shape, and configured to carry out an action at actual actuating locations along the respective path of the actuator, the system comprising a processor configured to:

define, for each path to be traced by an actuator, a plurality of target actuating locations regularly spaced by a target pitch;

determine the maximum velocity any actuator from the arrangement reaches along the respective path of the actuator during the relative movement;

define an error distance associated with each target actuating location to be the distance between the target actuating location and an actual actuating location which is closest to the target actuating location;

set a maximum value for the error distance, wherein the maximum value is greater than zero;

provide a first control signal comprising a sequence of actuation events for the arrangement, wherein the control signal is common to all actuators in the arrangement, wherein the sequence of actuation events corresponds to a sequence of potential actuating locations for each actuator along the path traced by the actuator, wherein the actuation events are provided at a regular interval, the interval being chosen so that the maximum distance between consecutive potential actuating locations for all actuators is limited to twice the maximum value for the error distance in the actual actuating location, wherein the maximum distance is the interval multiplied by the maximum velocity;

for each actuator, choose a subset of the potential actuating locations which is the set of actual actuating locations for the actuator wherein for each target actuating location of that actuator there is an actual actuating location in the set that is closer to the target actuating location than the maximum value for the error distance; and determine, for each actuation event in the sequence of actuation events, the subset of actuators from the arrangement wherein each actuator is at an actual actuating location from the set of actual actuating locations for the actuator.

BRIEF DESCRIPTION OF THE DRAWINGS

Aspects of the disclosure herein will now be described, by way of example only, with reference to the accompanying figures, in which.

DETAILED DESCRIPTION

Concepts relevant to the disclosure herein are provided to enable clarity and consistent terminology. Example aspects of the disclosure herein are provided below.
Arrangements of Nozzles (Nozzle Arrays)

Inkjet printing systems contain multiple nozzles, forming arrangement of nozzles, which share a control signal indicating when to create actuation events. In inkjet printing, printheads contain multiple nozzles forming nozzle arrays, ranging from a single row of nozzles to large 2D arrays. Nozzle arrays share a common drive signal received from drive electronics. A separate or integrated controller provides data switching to the printhead that determines which of the individual nozzles are to jet ink for a given instance of the actuation event.
Path (Print Path)

A "print path" describes the movement of the arrangement of nozzles relative to a surface for printing. For example, a print path is the relative movement of a nozzle arrangement and the object (shape) during the printing process. A 'path' describes the plurality of locations on the surface which are to pass under a nozzle. Determining the path of an individual nozzle provides the locus the nozzle traces across the target surface. This relative motion is equivalent even if the arrangement of nozzles is static and the object moves, or both move providing a relative motion.
Density Correction In an example, full height printing of cone shapes has been developed. While known processes include correcting the position of drops so that they match the position of pixels in a "wrapped" source image, there remains a requirement to correct for the changing density of the output caused by varying surface geometry, as illustrated in FIG. 1.

A print system comprises a printhead array receiving signals indicating when to create actuation events, and stripe data for groups of nozzles associated with shared actuation events. A nozzle of the printhead array moving along a flat surface is also referred to as a "flat nozzle". In this situation, each actuation event produces dots as deposits of fluid such as ink from driven nozzles of the printhead regularly spaced at the potential jetting locations 10 (where it is possible to place a dot) and thus achieving the target resolution (FIG. 1). The printed dots represent what we call 'actual jetting locations'.

Figure 1:
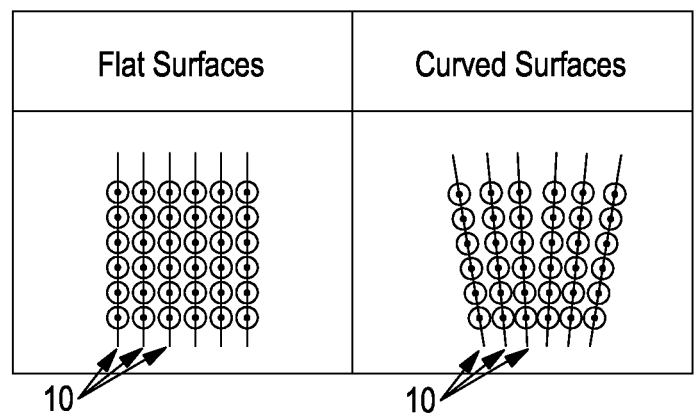
FIG. 1 is a schematic illustration of dots jetted (e.g. inkjet dots) on a flat surface and on a curved surface in the prior art.

When a nozzle is moving across a curved print path, at a different speed to that of another "flat" nozzle in the array, the distance between the actual jetting locations will differ from that achieved with the flat nozzle and thus the print density will be altered (as shown in FIG. 1). Accordingly, density correction of the output for curved surfaces is needed to achieve the density that would be normally achieved during standard printing of flat surfaces.

Figure 2:
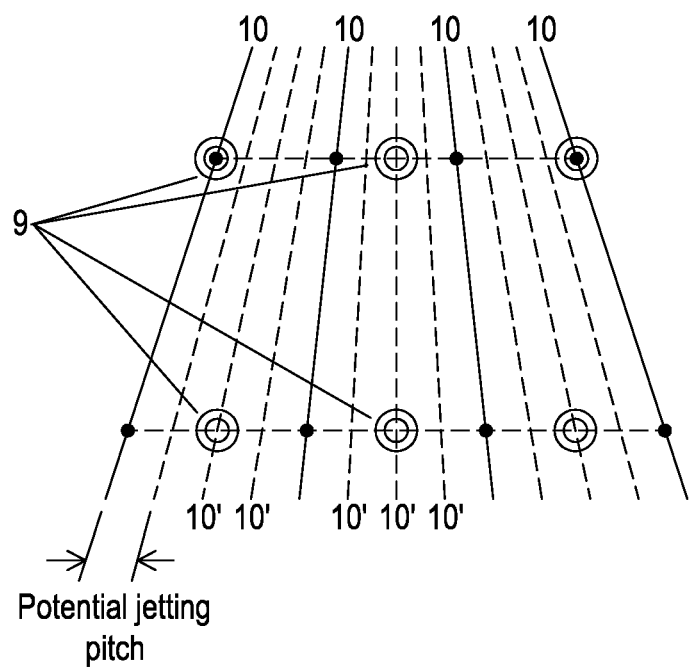
FIG. 2 is a schematic illustration of a method according to aspects of the disclosure herein.
Figure 3:
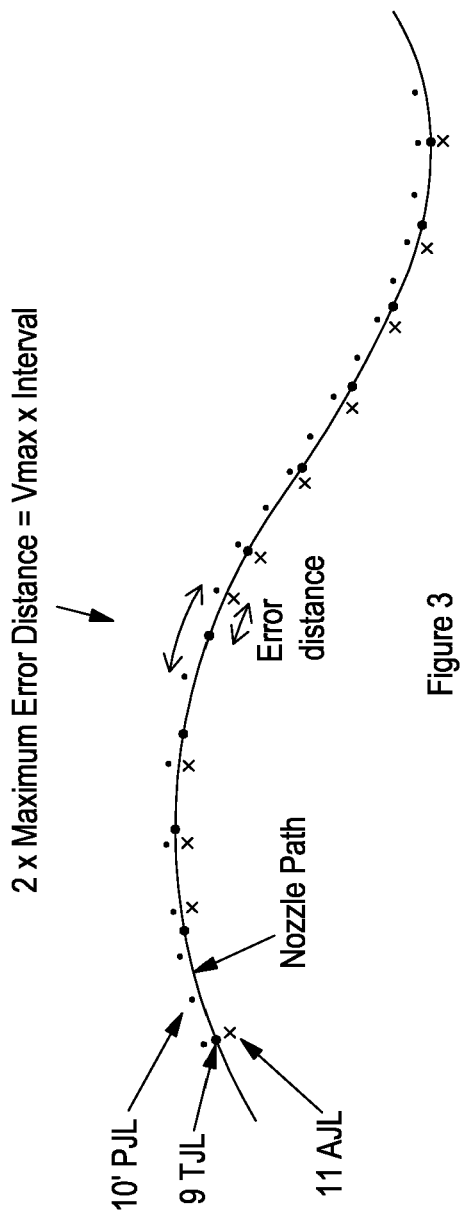
FIG. 3 is a schematic illustration of target jetting locations (TJL), potential jetting locations (PJL) according to the disclosure herein and actual jetting locations (AJL), respectively.

FIGS. 2 and 3 each show a succession of target jetting locations 9 where we wish to place a dot and a succession of potential jetting locations 10 (corresponding to actuation events), where it is possible to place a dot. In FIG. 2, the potential positions 10 are on the surface of a cone.

The actuation events at the potential positions 10 may be controlled by way of a synchronization element such as an encoder, clock or similar device. As shown schematically in FIGS. 2 and 3, the step size is adjusted by reducing the interval to obtain new potential jetting locations 10' from which actual jetting locations may be selected as a subset of the potential jetting locations, to be within the maximum error distance from the target jetting locations.

As each nozzle traces its print path, it achieves a velocity defined as the distance moved per unit interval. For an encoder-based system, this would be a distance per encoder pulse, and for a clock-based system, this would be a distance per unit time e.g. m/s. In order to limit the maximum error it is necessary to determine across all nozzles in the arrangement the maximum velocity attained by any nozzle during the relative movement of the arrangement and the surface.

According to the disclosure herein therefore, density correction is performed by using a reduced interval I between the actuation events, whilst selecting carefully which nozzles jet for any particular event.

By selecting an interval sufficiently small for the system, the maximum error distance between the actual jetting locations 11 and the corresponding target jetting locations 9 for all the nozzles in the system may be limited to the defined maximum error distance. Hence the disclosure herein makes it possible to achieve a printed dot resolution arbitrarily close to the required dot resolution. Typically, the defined maximum error distance is set to be 10 to 20% of the target pitch.

This disclosure herein makes it possible to compensate for variations in dot resolution across arrangements of nozzles which share common actuation events, caused by the nozzles moving at variable speeds across curved surfaces. As will be apparent to one skilled in the art, the same technique may be applied to one or more such arrangements, e.g. to one or more nozzle arrays within a printhead, and to one or more printheads within a printing system.

One cost of this approach is that the frequency of the actuation events (firing frequency) and swathe data are greater than if all the nozzles in the printhead array were being actuated at a single resolution for a given velocity. Accordingly, the chosen interval I represents a trade-off between the increased accuracy of drop placement achieved and productivity.

Although the disclosure herein has been described in terms of examples related to inkjet printing systems for dispensing ink at target locations as set forth above, it should be understood that these examples are illustrative only. It will be appreciated that the disclosure herein may be used for controlling or operating deposition systems suitable for making any placements or dispensing, that is placing any object at target locations. For example, the method may apply to a system dispensing fertiliser or sowing seeds from a trailer as it is towed. The method is then advantageous when the trailer moves around the corner at the edge of a field in order to correct density of the deposited seeds.

Those skilled in the art will be able to make modifications and alternatives in view of the disclosure which are contemplated as falling within the scope of the appended claims. Each feature disclosed or illustrated in the present specification may be incorporated in the disclosure herein, whether alone or in any appropriate combination with any other feature disclosed or illustrated herein.

The invention claimed is:

1. A method of controlling a deposition system comprising a printhead array that includes an arrangement of at least two nozzles, wherein the arrangement and a surface of an object move relative to each other, each nozzle of the printhead array being configured to trace a respective curved print path on the surface of the object and to jet drops at actual jetting locations along the respective curved print path of the nozzle of the printhead array, the method comprising steps of:
defining, for each curved print path traced by a nozzle, a plurality of target jetting locations regularly spaced by a target pitch;
determining a maximum velocity that each of the at least two nozzles reaches when tracing along the respective curved print path during relative movement, wherein relative velocities are different for different nozzles of the at least two nozzles;
defining an error distance associated with each target jetting location to be a distance between the target jetting location and an actual jetting location which is closest to the target jetting location;
setting a maximum value for the error distance, wherein the maximum value is greater than zero;
providing a first control signal comprising a sequence of actuation events for the arrangement, wherein the first control signal is common to all nozzles in the arrangement, wherein the sequence of actuation events corresponds to a sequence of potential jetting locations for each nozzle along the curved print path traced by the nozzle, wherein the actuation events are provided at a regular interval, the interval being chosen so that the maximum distance between consecutive potential jetting locations for all nozzles is limited to twice the maximum value for the error distance in the actual jetting location, and wherein the maximum distance between consecutive potential jetting locations is the interval multiplied by the maximum velocity;
for each nozzle, choosing a subset of the potential jetting locations which is a set of actual jetting locations for the nozzle, wherein, for each target jetting location of that nozzle, there is an actual jetting location in the set that is closer to the target jetting location than the maximum value for the error distance; and
determining, for each actuation event in the sequence of actuation events, a subset of nozzles from the arrangement, wherein each nozzle is at an actual jetting location from the set of actual jetting locations for the nozzle for jetting drops at the actual jetting locations along the respective curved print path of the nozzle of the printhead array.

2. The method according to claim 1, wherein the maximum value of the error distance is less than half the target pitch.

3. The method according to claim 2, wherein the maximum value of the error distance is between 10% and 20% of the target pitch.

4. The method according to claim 1, comprising:
providing image data for each actual jetting location; and
providing a second control signal to the arrangement of at least two nozzles to jet drops according to the image data.

5. The method according to claim 1, wherein the steps are performed for a first relative movement with a first maximum velocity and a first interval and the steps are then repeated for a second relative movement with a second maximum velocity, which is different from the first maximum velocity, and with a second interval, which is different from the first interval.

6. The method according to claim 1, wherein the step of choosing a subset of the potential jetting locations comprises identifying an actual jetting location in the set that is closest to the target jetting location.

7. The method according to claim 1, wherein in the step of defining, for each curved print path traced by a nozzle, a plurality of target jetting locations regularly spaced by a target pitch, a position of a first target jetting location is set within a distance from a start of the curved print path equal to the target pitch, wherein the distance is varied between curved print path according to a random distribution.

8. The method according to claim 1, comprising providing a synchronization element for coordinating the control signal with the movement of the arrangement relative to the surface of the object.

9. A control system for controlling a deposition system, the control system being configured to control a printhead array that includes an arrangement of at least two nozzles, wherein the arrangement and a surface of an object are moveable relative to each other, each nozzle of the printhead array being configured to trace a respective curved print path on the surface of the object and to jet drops at actual jetting locations along the respective curved print path of the nozzle of the printhead array, the system comprising a processor configured to perform steps of:

- defining, for each curved print path to be traced by a nozzle, a plurality of target jetting locations regularly spaced by a target pitch;
- determining a maximum velocity that each of the at least two nozzles reaches when tracing along a respective path during the relative movement, wherein the relative velocities are different for different nozzles of the at least two nozzles;
- defining an error distance associated with each target jetting location to be a distance between the target jetting location and an actual jetting location which is closest to the target jetting location;
- setting a maximum value for the error distance, wherein the maximum value is greater than zero;
- providing a first control signal comprising a sequence of actuation events for the arrangement, wherein the first control signal is common to all nozzles in the arrangement, wherein the sequence of actuation events corresponds to a sequence of potential jetting locations for each nozzle along the curved print path traced by the nozzle, wherein the actuation events are provided at a regular interval, the interval being chosen so that the maximum distance between consecutive potential jetting locations for all nozzles is limited to twice the maximum value for the error distance in the actual jetting location, and wherein the maximum distance between consecutive potential jetting locations is the interval multiplied by the maximum velocity;
- for each nozzle, choosing a subset of the potential jetting locations which is a set of actual jetting locations for the nozzle, wherein for each target jetting location of that nozzle there is an actual jetting location in the set that is closer to the target jetting location than the maximum value for the error distance; and
- determining, for each actuation event in the sequence of actuation events, a subset of nozzles from the arrangement wherein each nozzle is at an actual jetting location from the set of actual jetting locations for the nozzle for jetting drops at the actual jetting locations along the respective curved print path of the nozzle of the printhead array.

10. A printing system comprising a control system according to claim 9.

11. The control system according to claim 9, wherein the maximum value of the error distance is less than half the target pitch.

12. The control system according to claim 11, wherein the maximum value of the error distance is between 10% and 20% of the target pitch.

13. The control system according to claim 9, wherein the processor is configured for:

- providing image data for each actual jetting location; and
- providing a second control signal to the arrangement of at least two nozzles to jet drops according to the image data.

14. The control system according to claim 9, wherein the steps are performed for a first relative movement with a first maximum velocity and a first interval and the steps are then repeated for a second relative movement with a second maximum velocity, which is different from the first maximum velocity, and with a second interval, which is different from the first interval.

15. The control system according to claim 9, wherein the step of choosing a subset of the potential jetting locations comprises identifying an actual jetting location in the set that is closest to the target jetting location.

16. The control system according to claim 9, wherein, in the step of defining, for each curved print path traced by a nozzle, a plurality of target jetting locations regularly spaced by a target pitch, a position of a first target jetting location is set within a distance from a start of the curved print path equal to the target pitch, wherein the distance is varied between curved print path according to a random distribution.

17. The control system according to claim 9, wherein the processor is configured for providing a synchronization element for coordinating the control signal with the movement of the arrangement relative to the surface of the object.

* * * * *